(12) United States Patent
Spadacini

(10) Patent No.: US 12,173,649 B2
(45) Date of Patent: *Dec. 24, 2024

(54) ENERGY STORAGE PLANT AND PROCESS

(71) Applicant: ENERGY DOME S.P.A., Milan (IT)

(72) Inventor: Claudio Spadacini, Ghiffa (IT)

(73) Assignee: ENERGY DOME S.P.A., Milan (IT)

( * ) Notice: Subject to any disclaimer, the term of this patent is extended or adjusted under 35 U.S.C. 154(b) by 204 days.

This patent is subject to a terminal disclaimer.

(21) Appl. No.: 17/904,429

(22) PCT Filed: Feb. 15, 2021

(86) PCT No.: PCT/IB2021/051234
§ 371 (c)(1),
(2) Date: Aug. 17, 2022

(87) PCT Pub. No.: WO2021/165809
PCT Pub. Date: Aug. 26, 2021

(65) Prior Publication Data
US 2023/0105405 A1 Apr. 6, 2023

(30) Foreign Application Priority Data
Feb. 21, 2020 (IT) .................. 102020000003680

(51) Int. Cl.
*F01K 25/10* (2006.01)
*F02C 6/14* (2006.01)

(52) U.S. Cl.
CPC .............. *F02C 6/14* (2013.01); *F01K 25/10* (2013.01); *F05D 2220/70* (2013.01)

(58) Field of Classification Search
CPC ........ F01K 25/08; F01K 25/085; F01K 25/10; F01K 25/103; F02C 6/14; F02C 1/10
See application file for complete search history.

(56) References Cited

U.S. PATENT DOCUMENTS 4,995,234 A * 2/1991 Kooy .................. F01K 25/10
60/659
2010/0101231 A1 4/2010 Westmeier
(Continued)

FOREIGN PATENT DOCUMENTS

CN 109681279 A 4/2019
DE 10 2014 101 263 B3 7/2015
(Continued)

OTHER PUBLICATIONS

U.S. Appl. No. 17/431,350, filed Aug. 16, 2021, US 2022/0145778 A1, Claudio Spadacini.
(Continued)

*Primary Examiner* — Gerald L Sung
(74) *Attorney, Agent, or Firm* — Oblon, McClelland, Maier & Neustadt, L.L.P.

(57) ABSTRACT

An energy storage plant includes a casing for the storage of a working fluid different from atmospheric air, in gaseous phase and in pressure equilibrium with the atmosphere; and a tank for the storage of said working fluid in liquid or super-critical phase with a temperature close to the critical temperature. The critical temperature is close to the ambient temperature. The plant is configured to perform a closed cyclic thermodynamic transformation, first in one direction in a charge configuration and then in an opposite direction in a discharge configuration, between said casing and said tank. In the charge configuration the plant stores heat and pressure and in the discharge configuration generates mechanical energy to drive a driven machine.

13 Claims, 4 Drawing Sheets

(56) References Cited

U.S. PATENT DOCUMENTS

| | | | |
|---|---|---|---|
| 2011/0283702 A1* | 11/2011 | Huber | F01D 15/10 |
| | | | 60/671 |
| 2012/0216520 A1 | 8/2012 | Chen et al. | |
| 2013/0043678 A1* | 2/2013 | Saar | F02C 1/10 |
| | | | 165/45 |
| 2013/0213040 A1* | 8/2013 | Goswami | F01K 13/00 |
| | | | 60/647 |
| 2013/0327041 A1 | 12/2013 | Gaertner et al. | |
| 2013/0333385 A1* | 12/2013 | Herbst | F01K 25/103 |
| | | | 60/645 |
| 2016/0281545 A1 | 9/2016 | Petrosky | |
| 2018/0179917 A1 | 6/2018 | Apte et al. | |
| 2018/0187628 A1 | 7/2018 | Apte | |
| 2018/0340712 A1 | 11/2018 | Peter et al. | |
| 2019/0234305 A1 | 8/2019 | Ramamurthy et al. | |
| 2020/0025042 A1 | 1/2020 | Apte et al. | |
| 2020/0103163 A1* | 4/2020 | Beck | F01K 11/00 |
| 2020/0182148 A1 | 6/2020 | Williams et al. | |
| 2021/0164404 A1 | 6/2021 | Apte et al. | |
| 2024/0003272 A1* | 1/2024 | Xie | F01K 3/12 |

FOREIGN PATENT DOCUMENTS

| | | |
|---|---|---|
| GB | 2484080 A | 4/2012 |
| GB | 2537126 A | 10/2016 |
| WO | WO 2008/108435 A1 | 9/2008 |
| WO | WO 2009/113954 A1 | 9/2009 |
| WO | WO 2014/206708 A1 | 12/2014 |
| WO | WO 2018/218617 A1 | 12/2018 |

OTHER PUBLICATIONS

International Search Report and Written Opinion issued Jul. 8, 2021, in PCT/IB2021/051234 filed Feb. 15, 2021, 11 pages.

International Search Report and Written Opinion issued Apr. 6, 2020, in PCT/IB2019/060896 filed Dec. 17, 2019, 9 pages.

Office Action issued May 24, 2022, for the corresponding U.S. Appl. No. 17/431,350, filed Aug. 16, 2021, 26 pages.

* cited by examiner

ENERGY STORAGE PLANT AND PROCESS

FIELD OF THE FINDING

The object of the present invention is a plant and a process for energy storage. More precisely, the object of the present invention is a system capable of absorbing/using energy, of maintaining the stored energy over time and capable of retransforming it into mechanical energy for the actuation of one or more driven machines and possibly also capable of transforming it into electric energy and re-introducing it into the grid at times of request of said electric energy. Preferably but not exclusively, the system is capable of absorbing/using electric energy from a grid or a system in the periods in which there is an excess of availability or scarcity of consumption and/or also from electric motors or heat engines (e.g. from gas turbines or vapor turbines) or still other types of motor (e.g. hydraulic or wind). More in detail, the present invention relates to a system for storing electric energy in the form of potential energy (pressure) and thermal/thermo-dynamic energy. The present invention is situated in the field of medium and large scale energy storage systems, for both land and marine applications, typically with powers ranging from hundreds of kW up to tens of MW (e.g. 20-25 MW), but also hundreds of MW, and with storage capacities from hundreds of kWh, up to hundreds of MWh and also up to various GWh. The present invention is also situated in the field of small scale energy storage systems, for domestic and commercial applications, both land and marine, typically with powers ranging from a few kW up to several hundred kW and with storage capacities from a few kWh, up to hundreds of kWh.

Definitions

In the present description and in the enclosed claims, reference will be made to the following definitions.

Thermodynamic cycle (TC): thermodynamic transformation from a point X to a point Y, where X coincides with Y; the TC unlike the CTT (Cyclic thermodynamic transformation), stated below, does not have mass accumulations (significant for energy purposes) within the cycle, while the CTT typically works between two storages, one initial and the other final, of working fluid;

Cyclic thermodynamic transformation (CTT): thermodynamic transformation from a point X to a point Y and from a point Y to a point X, without necessarily passing from the same intermediate points;

Closed TC and/or CTT: without mass exchange (significant for energy purposes) with the atmosphere;

Open TC and/or CTT: with mass exchange (significant for energy purposes) with the atmosphere.

BACKGROUND OF THE FINDING

Recently, due to the increasing diffusion of systems for producing energy from renewable sources and in particular from wind and photovoltaic sources, which are characterized by production unpredictability and variability, electric energy storage systems have been taking on increasing importance.

The electric energy storage systems can perform different essential functions for the grids, whether they are isolated or interconnected, including the adjustment of frequency/supply of dynamic inertia, the supply of "flexible ramping" systems, i.e. which allow the entering into operation of emergency production systems, "energy shifting" from hours of greater production and smaller request to hours which, vice versa, have greater request and/or lack of production, seasonable compensations, etc.

Alongside the systems which operate according to electrochemical principles (Batteries) which typically have high costs and limited life time, mechanical principles (Flywheels) only suitable for small quantities of stored energy, the systems presently used today, or being developed or in any case known, include the following.

The systems mainly in use are the hydroelectric pumping storage systems (PUMPED HYDRO STORAGE—PHS), which currently cover more than 90% of the storage capacity installed worldwide. Said systems are suitable both for long-term storage and short-term, they are rather competitive as costs, but have the disadvantage that they can only be made in places that have particular geo-morphological conditions. Said PHS system is listed among the energy storage systems, in potential and in particular gravitational form. Still in the family of gravitational systems, there is also the system pursuant to document GB 2518125 A.

A second system in use is the so-called CAES (Compressed Air Energy Storage) system which is constituted by an Open CTT which accumulates by means of transformation into potential energy (pressure) and (possibly) thermal energy. Such CAES system is known both in the base configuration (non-adiabatic) which in the most advanced AA-CAES (Advanced Adiabatic CAES; see U.S. Pat. No. 4,147,205—Compressed Air Storage Installation). Said systems are adapted both for long-term and short-term storage, are rather competitive as costs, the 'Round Trip Efficiency' terms are less efficient than the PHS system, and the systems also have the disadvantage in that they can only be attained in places which have particular geomorphological conditions.

The CAES systems also have a further disadvantage due to the fact that the pressure of the tank/cavity varies with the variation of the charge level of the same. This affects both the efficiency of the CTT, and the efficiency of the turbomachines that execute the same.

Systems are also known for avoiding the presence of subterranean cavities for the CAES systems. In particular, solutions are known which seek to render economically advantageous the storage of the energy in over-ground tanks, without having to have subterranean cavities. One example is found in US2011/0204064 A1 of LIGHTSAIL where tanks of special construction are proposed in order to limit the costs of the over-ground storage tanks, which otherwise would render the costs of said over-ground CAES systems overly high. Also these solutions belong to the systems which work according to an Open CTT.

Systems are also known which combine the two preceding systems (see U.S. Pat. No. 7,663,255 B2), in which the combination between CAES and PHS also allows operating the CAES system at constant compression pressure. Also these systems work according to an Open CTT.

The document 'Novel concept of compressed air energy storage and thermos-electric energy storage'—THESE N.5525 (2012)—Ecole Polytechnique Federale de Lousanne, illustrates all types of CAES energy storage systems. Among others, diabatic, adiabatic and isothermal CAES systems are presented, and combined with PHS, in order to allow a constant compression pressure, said system is termed Constant Pressure-CAES combined with PHS. Also these are systems which work according to an Open CTT.

The same document mentioned above also illustrates the so-called TEES (Thermo Electric Energy Storage) proposed by ABB Corporate Research Center (see also EP 2532843 A1 and EP 2698506 A1). This belongs to the systems which work according to a Closed TC, and it is listed among the PHES systems. The PHES systems (pumped heat electrical storage) are systems for storing electrical/mechanical energy by means of transformation into thermal energy by means of for example Rankine, Brayton or Kalina TC.

In addition to the above-described systems which provide for the use of trans-critical and super-critical cycles with $CO_2$ or other fluids and hence of the reversible trans-super-critical Rankine cycles, the PHES systems with Brayton cycle are known, typically using Argon, but also air (see Isoentropic EP 2220343 B1 and US 2010/0257862 A1 and Laughlin US 2016/0298455 A1). This belongs to the systems which work according to a Closed TC, and can be listed among the PHES systems. Another system that can be listed among the PHES/TEES systems is the Siemens-Gamesa system (see US 2014/0223910 A1 and U.S. Pat. Nos. 8,991,183 B2 and 8,966,902 B2) which combines two different cycles for the charge and discharge phase, and in particular it provides for a Brayton cycle or simple dissipation with electrical heating elements for the charge phase of the heat storage tank at high temperature and a steam Rankine cycle for the electric energy discharge/production phase. This solution type can be listed among the PHES systems. It is attained by means of multiple Open and/or Closed TC.

It is observed that all the PHES systems, also termed TEES, are based on a principle of 'closed' and reversible thermodynamic cycle. Depending on the different proposed solutions, 'closed' Rankine or Brayton cycles can be proposed, but in any case the working fluid of the nearly-reversible heat motor/pump executes transformations according to a 'closed' thermodynamic cycle in which there are no intermediate storages sized in relation to the required storage capacity.

All the CAES systems, of all the types, are instead systems which carry out transformations, first in one direction and then in the other according to an 'open' thermodynamic cycle, i.e. by taking and returning air into the atmosphere.

Another known method for storing energy is the so-called LAES (Liquid Air Energy Storage, see US2009/0282840 A1) system. The LAES method provides for transformations according to an 'open' thermodynamic transformation, i.e. taking and returning air from/to the atmosphere. In addition, such system works at cryogenic temperatures, close to −200° C. with high technical difficulties. Also this belongs to the systems which work according to an Open CTT.

In 'Analysis of the exergy efficiency of a super-critical compressed carbon dioxide energy-storage system based on the orthogonal method' by Qing He, Yinping Hao, Hui Liu, Wenyi Liu, it was also proposed to use $CO_2$ as working fluid for energy storage systems. The proposed system (termed SC-CCES (Super Critical-Compressed Carbon dioxide Energy Storage)), uses as specified "two saline aquifers as storage reservoirs". In said SC-CCES system, the $CO_2$ from the delivery of the compressor is sent directly to the reservoir without interposition of any heat exchanger and/or of thermal energy storage system. In addition during the discharge cycle, the $CO_2$ discharged from the turbine heats, through a recuperator, the same $CO_2$ entering the turbine. This solution belongs to the systems which work according to a Closed CTT, i.e. between two closed tanks.

Also the document 'Green Energy Storage: "The Potential Use of compressed Liquid $CO_2$ and Large Sub-Terrain Cavities to Help Maintain a Constant Electricity Supply"—Dalgaard J Z, speaks (both in the title and in the abstract, and in the body of the document) of use of $CO_2$ in subterranean cavities.

SUMMARY

The Applicant has observed that the present energy accumulation/storage systems do not have characteristics which allow cost-effective use in different situations.

In particular, in some cases (e.g. PHS and CAES) the systems require very particular geomorphological situations that are hard to find. In some cases (e.g. PHS) the attainment of said systems requires the manufacturing of artificial basins, with significant environmental impact.

In other cases (AA-CAES) the attainment of the thermal energy storage systems has problems that are hard to resolve at low cost and in addition there remains the need to identify suitable subterranean cavities. The above also involves difficulties in obtaining satisfying Round Trip Efficiencies (RTE). In any case, there remains the problem of working with variable pressures in the storage tank, suitable for combining the CAES system with the PHS system, with clear further complication of costs and for identifying the correct geological conditions.

The Applicant has further observed that the attempts of attaining surface CAES systems have met with the practical impossibility of making tanks for storing pressurized air with a competitive cost, in order to allow the attainability of the systems themselves.

The Applicant has further observed that the attempts to make LAES systems at the moment have not allowed developing inexpensive systems also due to the intrinsic problems in working in cryogenic conditions. The problems of storing the cryogenic energy, in double-layer tanks with vacuum between the layers, and other costly expedients renders the technology hard to optimize from the cost standpoint.

The Applicant has further observed that the attempts to make PHES systems with nearly-reversible Rankine cycles has considerable difficulties in obtaining satisfactory Round Trip Efficiencies (RTE) (i.e. greater than 60%) and simultaneously with reasonable costs, the RTE being bound to the temperature differences in the apparatuses.

In the same manner, the PHES systems based on Brayton cycle must encounter the fact that said systems use a compressor and a turbine for each cycle, both charge and discharge. This involves greater investment costs, but also higher irreversibility that can be compensated, in order to obtain high RTEs, only by maintaining very high temperature differences between hot and cold storage.

In such context, the Applicant has set the objective of ideating and making an energy storage process and an energy storage plant, i.e. an energy storage system, which is:
  attainable in various geomorphological situations, which
    do not require particular geographic or territorial conditions in order to be attained and which may possibly, in certain sizes, be used for marine/off-shore applications;
  capable of obtaining high RTEs, in any case greater than
    70% and up to 75% and even up to 80% and higher;
  capable of working with pressures in the storage tanks
    that are adjustable, by means of various systems
    described hereinbelow;
  simple and inexpensive, preferably with the target of
    having an attainment cost lower than 100 USD/kWh and, in particular, which allows storages under pressure and with high energy density (in terms of $m^3_{storage}/kWh_{stored}$);

capable of being able to increase its own RTE by using the variations of ambient temperature;

safe and compatible with the environment, for example which does not use particularly dangerous fluids;

modular;

compact;

30 years increased lifetime or durable;

flexible and capable of quickly entering operation;

easily and inexpensively maintainable;

corrosion-resistant (in particular for naval applications);

which has a low level of vibrations and noise.

The Applicant has also set as objective that of driving driven machines with the accumulated energy that would otherwise be lost, directly exploiting (i.e. without transforming it into electric energy) the mechanical energy produced by the process and energy storage plant.

The Applicant has found that the above-indicated objectives and still others can be reached by means of an Energy Storage system operating by means of cyclic thermodynamic transformations (CTT), first in one direction and then in the opposite sense, between two accumulations of a working fluid in two separate tanks, of which one (that at lower pressure) is atmospheric, not constituted by atmospheric air but rather by another gas in pressure equilibrium with the atmosphere. Said system is also characterized in that it stores the energy transforming the working fluid from an initial gaseous/vapor state to a final liquid or super-critical state with temperature close to the critical temperature (e.g. less than 1.2 times the critical temperature in Kelvin, preferably between 0.5 and 1.2 times). It is also characterized in that said critical temperature is preferably not far from the ambient temperature, preferably close to the ambient temperature (preferably between 0° C. and 200° C., more preferably between 0° and 100° C.).

The working fluid is preferably carbon dioxide ($CO_2$), but in order to improve the performances of the system, also in relation to the particular environmental conditions where one is set to operate, a mixture of $CO_2$ and other substances could be used in order to correct the critical temperature $T_c$ of the fluid. Other fluids, such as $SF_6$, $N_2O$, etc., can be used, still pure or in mixture with others.

In the system proposed in this invention, there is a storage of heat recovered from the delivery of a compressor. Tanks, both at high and low pressure, work at constant pressures or in any case at pressures adjusted within certain well-defined ranges, both when the system operates in sub-critical conditions and super-critical conditions, possibly with different adjustment strategies.

In particular, the indicated objectives and still others are substantially achieved by a plant and by a process for energy storage of the type claimed in the enclosed claims and/or described in the following aspects.

In an independent aspect, the present invention regards an energy storage plant.

Preferably, the plant comprises:

a working fluid different from atmospheric air;

a casing configured to store the working fluid, in gaseous phase and in pressure equilibrium with the atmosphere;

a tank for the storage of said working fluid in liquid or super-critical phase with a temperature close to the critical temperature (e.g. lower than 1.2 times the critical temperature in Kelvin 0.5-1.2); wherein said critical temperature is comprised between 0° C. and 200° C., more preferably between 0° C. and 100° C., preferably close to the ambient temperature;

at least one driven machine different from an electric generator;

wherein the plant is configured to perform a closed cyclic thermodynamic transformation (CTT), first in one direction in a charge configuration/phase and then in an opposite direction in a discharge configuration/phase, between said casing and said tank; wherein in the charge configuration, the plant stores heat and pressure and in the discharge configuration it generates mechanical energy and transfers it to the driven machine to drive said driven machine.

Preferably, the working fluid has the following chemical-physical properties: critical temperature comprised between 0° C. and 100° C., density at 25° C. comprised between 0.5 and 10 $Kg/m^3$, preferably comprised between 1 and 2 $Kg/m^3$.

Preferably, the working fluid is selected from the group comprising: $CO_2$, $SF_6$, $N_2O$, or a mixture of the same, or also a mixture of the same with other components which act as additives, for example mainly for modifying the parameters of critical temperature of the resulting mixture so as to optimize the performances of the system.

Preferably, the energy storage plant comprises:

a compressor and a motor mechanically connected to each other;

a turbine mechanically connected to the driven machine;

said casing externally in contact with the atmosphere and delimiting at its interior a volume configured to contain the working fluid at atmospheric pressure or substantially atmospheric pressure, wherein said volume is selectively in fluid communication with an inlet of the compressor or with an outlet of the turbine;

a primary heat exchanger (or even multiple primary exchangers possibly operating also with different fluids on its own secondary side) selectively in fluid communication with an outlet of the compressor or with an inlet of the turbine;

said tank in fluid communication with the primary heat exchanger to accumulate the working fluid;

a secondary heat exchanger operationally active between the primary heat exchanger and the tank or in said tank.

Such plant is configured to operate in a charge configuration or in a discharge configuration.

In the charge configuration, the casing is in fluid communication with the inlet of the compressor and the primary heat exchanger is in fluid communication with the outlet of the compressor, the turbine is at rest, the motor is operating and drives the compressor to compress the working fluid coming from the casing, the primary heat exchanger works as a cooler to remove heat from the compressed working fluid, cool it and store thermal energy, the secondary heat exchanger works as a cooler to remove further heat from the compressed working fluid and store further thermal energy, the tank receives and stores the compressed and cooled working fluid, wherein the working fluid accumulated in the tank has a temperature close to its own critical temperature (for example comprised between 0.5 and 1.2 of the critical temperature in Kelvin).

In the discharge configuration, the casing is in fluid communication with the outlet of the turbine and the primary heat exchanger is in fluid communication with the inlet of the turbine, the compressor is at rest, the secondary heat exchanger works as a heater to transfer heat to the working fluid coming from the tank, the primary heat exchanger works as a heater to transfer further heat to the working fluid and heat it, the turbine is rotated by the heating working fluid and drives the driven machine, the working fluid returns in the casing at the atmospheric pressure or substantially atmospheric pressure.

In an independent aspect, the present invention regards a process for energy storage, optionally implemented with the plant according to the preceding aspect or according to at least one of the following aspects.

Preferably, the process comprises: carrying out a closed cyclic thermodynamic transformation (CTT), first in one direction in a charge configuration/phase and then in an opposite direction in a discharge configuration/phase, between a casing for the storage of a working fluid different from atmospheric air, in gaseous phase and in pressure equilibrium with the atmosphere, and a tank for the storage of said working fluid in liquid or super-critical phase with a temperature close to the critical temperature (for example comprised between 0.5 and 1.2 of the critical temperature in Kelvin); wherein said critical temperature is close to the ambient temperature, preferably between 0° C. and 100° C., but also up to 200° C.; wherein in the charge phase the process accumulates heat and pressure and in the discharge phase generates mechanical energy and transfers it to a driven machine different from an electric generator to drive said driven machine.

Preferably, said working fluid has the following chemical-physical properties: critical temperature comprised between 0° C. and 200° C., more preferably between 0° C. and 100° C., preferably close to the ambient temperature.

Preferably, said working fluid is selected from the group comprising: $CO_2$, $SF_6$, $N_2O$, or a mixture of the same, or even a mixture of the same with other components which act as additives, for example mainly for modifying the parameters of critical temperature of the resulting mixture so as to optimize the performances of the system.

Preferably, the process comprises an energy charge phase and a phase of discharge and generation of energy.

The charge phase comprises:
compressing the working fluid, coming from said casing externally in contact with the atmosphere and delimiting at its interior a volume configured to contain said working fluid at atmospheric pressure or substantially atmospheric pressure, absorbing energy;
introducing the compressed working fluid through a primary heat exchanger (or even multiple primary exchangers possibly also operating with different fluids on its own secondary side) and a secondary heat exchanger placed in series to bring a temperature of the working fluid in proximity to its own critical temperature; wherein the primary heat exchanger works as a cooler to remove heat from the compressed working fluid, cooling it and storing thermal energy, wherein the secondary heat exchanger works as a cooler to remove further heat from the compressed working fluid and storing further thermal energy;
accumulating the cooled working fluid in said tank; wherein the secondary heat exchanger and the primary heat exchanger carry out a super-critical transformation of the working fluid so that said working fluid is accumulated in the tank in super-critical phase or wherein the secondary heat exchanger and the primary heat exchanger carry out a sub-critical transformation of the working fluid so that said working fluid is accumulated in the tank in liquid phase (preferably also with the objective of adjusting the pressure at a relatively minimal/low value).

The phase of discharge and generation of energy comprises:
passing the working fluid, coming from the tank, through the secondary heat exchanger and the primary heat exchanger; wherein the secondary heat exchanger works as a heater to transfer heat to the working fluid coming from the tank (preferably also with the objective of adjusting the pressure at a relatively maximum/high value), wherein the primary heat exchanger works as a heater to transfer further heat to the working fluid and heat it;
passing the heating working fluid through a turbine, wherein the turbine is rotated by the heating working fluid and drives the driven machine, wherein the working fluid is expanded and is cooled in the turbine;
re-introducing the working fluid coming from the turbine in the casing at atmospheric pressure or substantially atmospheric pressure.

The Applicant has verified that the process and the apparatus according to the invention allow obtaining the pre-established objectives.

In particular, the Applicant has verified that the invention allows operating the storage of energy in places without particular geomorphological characteristics, also for marine/off-shore applications, in a safe manner and with a low environmental impact.

The Applicant has also verified that the manufacturing and also the subsequent maintenance of an apparatus according to the invention are relatively inexpensive.

The Applicant has also verified that the invention allows obtaining high RTEs.

The Applicant has also verified that the invention allows operating an energy storage with possibility to adjust the pressure in the storage tanks, thus allowing an improved operability of the system, a greater efficiency both of the turbomachines and of the system in terms of RTE.

The Applicant has also verified that, in the discharge configuration, the direct transmission of mechanical energy to the driven machine (by means of a direct mechanical connection of the plant to said driven machine) allows exploiting the previously accumulated energy in an efficient manner. Indeed, electric energy—which would then have to be re-transformed into mechanical energy—is not produced.

Aspects of the invention are listed hereinbelow.

In one aspect, the driven machine is any one driven machine with moving parts, which are driven directly by the turbine and which carry out a work, for example on a fluid or another element.

In one aspect, the driven machine is a compressor or a pump, optionally for pipelines or used for producing a process gas, a pump for water or for liquified natural gas (LNG).

In one aspect, the driven machine comprises a transmission shaft mechanically connected to the shaft of the turbine.

In one aspect, a reducer or gear transmission box is interposed between the turbine and the driven machine.

In one aspect, connection devices, preferably of friction type, are interposed between the turbine and the driven machine in order to connect/disconnect the driven machine to/from the turbine.

In one aspect, the primary heat exchanger is, or is operationally associated with, a thermal accumulator (Thermal Energy Storage—TES).

In one aspect, first pipes are extended between the casing and the inlet of the compressor and between the casing and the outlet of the turbine in order to place said casing in fluid communication with said compressor and turbine.

In one aspect, at least one valve is operationally placed on said first pipes in order to alternately place in fluid communication the casing with the compressor or the turbine with the casing.

In one aspect, second pipes are extended between the inlet of the turbine and the primary heat exchanger and between the outlet of the compressor and the primary heat exchanger in order to place said primary heat exchanger in fluid communication with said compressor and turbine.

In one aspect, at least one valve is operationally placed on said second pipes in order to alternately place in fluid communication the compressor with the primary heat exchanger or the primary heat exchanger with the turbine.

In one aspect, third pipes are extended between the primary heat exchanger and the secondary heat exchanger in order to place said primary heat exchanger in fluid communication with said secondary heat exchanger.

In one aspect, an additional heat exchanger is operationally placed between the casing and the compressor and between the casing and the turbine in order to pre-heat the working fluid before the compression in the compressor, in the charge configuration, or in order to cool the working fluid coming from the turbine, in the discharge configuration.

In one aspect, the additional heat exchanger is operationally associated with the first pipes.

In one aspect, the additional heat exchanger comprises a further thermal energy storage device.

In one aspect, in the charge configuration, the additional heat exchanger works as a heater in order to pre-heat working fluid.

In one aspect, in the discharge configuration, the additional heat exchanger works as a cooler to cool the working fluid and store additional thermal energy which is used in the charge configuration in order to pre-heat said working fluid.

In one aspect, a cooler is positioned on a branch of the first pipes connected to the outlet of the turbine.

In one aspect, a further heat exchanger operationally coupled to an additional heat source is operationally placed between the turbine and the primary heat exchanger and is configured to further heat the working fluid in the discharge phase before entering the turbine.

In one aspect, in the discharge configuration, the additional heat source supplies additional heat to the working fluid.

In one aspect, in the phase of discharge and generation of energy, between the primary heat exchanger and the turbine, it is provided to further heat the working fluid by means of an additional heat source.

In one aspect, the additional heat source is: a solar source (e.g. solar field) and/or industrial waste heat recovery and/or gas turbine exhaust heat (GT).

In one aspect, a temperature to which the working fluid is brought in the discharge phase and just before entering the turbine, by means of the additional heat source and the further heat exchanger, is higher than a temperature of the working fluid at the end of compression during the charge phase.

In one aspect, the temperature to which the working fluid is brought by means of the additional heat source and the further heat exchanger is about 100° C., or even 200° C. or even 300° C. or even 400° C. higher than the temperature of the working fluid at the end of compression.

The Applicant has verified that the further heating of the working fluid by means of the additional heat source allows considerably increasing the Round Trip Efficiency (RTE).

In one aspect, the casing is deformable.

In one aspect, the casing has the structure of a gasometer.

In one aspect, the casing is a pressure-balloon.

In one aspect, the casing is made of flexible material, preferably plastic, e.g. of PVC coated polyester fabric.

In one aspect, a generator is also mechanically connected or connectable to the turbine, wherein, in the discharge configuration, the turbine drives the generator, also generating electric energy.

In one aspect, in the discharge phase said process also generates electric energy.

In one aspect, the motor is an electric motor.

In one aspect, the motor is a heat engine.

In one aspect, the motor is a hydraulic motor or wind motor.

In one aspect, the motor is a turbine, optionally gas or vapor turbine, optionally hydraulic or wind.

The Applicant has verified that the plant according to the invention is capable of accumulating not only excess electric energy (absorbing electric energy from the grid) but also directly mechanical energy coming from a generic motor intended as drive machine. The plant is therefore also capable of absorbing and accumulating mechanical energy and re-transforming it into mechanical energy without conversions into electric energy.

In one aspect, the motor and the generator are separate elements, wherein the motor is preferably stably connected to the compressor and the generator is preferably stably connected to the turbine.

In one aspect, the motor and the generator are defined by a single motor-generator.

In one aspect, the plant comprises connection devices, preferably of friction type, interposed between the motor-generator and the compressor and also interposed between the motor-generator and the turbine to connect mechanically and alternately the motor-generator to the compressor or to the turbine.

In one aspect, the motor-generator, the compressor and the turbine are arranged on a same axis.

In one aspect, an auxiliary motor, preferably electric, is connected to the driven machine and is configured to drive said driven machine at least when the plant is in the charge configuration.

In one aspect, an auxiliary generator is mechanically interposed between the turbine and the driven machine.

In one aspect, connection devices, preferably of friction type, are interposed between the auxiliary generator and the turbine to selectively connect said auxiliary generator to the turbine.

In one aspect, the auxiliary motor and the auxiliary generator are defined by a single auxiliary motor-generator.

In one aspect, the compression of the working fluid in the compressor is adiabatic, inter-cooled or isothermal.

In one aspect, the expansion of the working fluid in the turbine is adiabatic, inter-heated or isothermal.

In one aspect, an auxiliary thermal accumulator (Thermal Energy Storage TES) is connected to the compressor and to the turbine.

In one aspect, the auxiliary thermal accumulator is configured for attaining, in the compressor and during the charge phase, an inter-cooled compression, with one or more inter-coolings.

In one aspect, the auxiliary thermal accumulator is configured for attaining, in the turbine and during the discharge phase, an inter-heated expansion, with one or more inter-heatings.

In one aspect, it is provided to carry out a plurality of inter-coolings in the charge phase and to carry out a number of inter-heatings less than the number of inter-coolings by using heat (accumulated in the auxiliary thermal accumulator) only of part of the inter-coolings.

In one aspect, it is provided to carry out a plurality of inter-coolings in the charge phase and to carry out only one inter-heating in the discharge phase by using heat (accumulated in the auxiliary thermal accumulator) only of the last inter-cooling.

The Applicant has verified that the combination of the further heating of the working fluid by means of the additional heat source, together with the inter-coolings and with the inter-heatings mentioned above, allows increasing the Round Trip Efficiency (RTE) up to values higher than 100%.

In one aspect, the primary heat exchanger is or comprises a heat regenerator with fixed or movable bed.

In one aspect, the heat regenerator with fixed or movable bed comprises at least one thermal mass hit by the working fluid.

In one aspect, the heat regenerator with fixed or movable bed comprises at least one thermal mass not hit by the working fluid, but separated from the same by a wall, typically metal, adapted to limit the pressure, and hence the mass is situated at atmospheric pressure.

In one aspect, the thermal mass comprises loose material, optionally gravel or metal or ceramic balls.

In one aspect, the thermal mass comprises cohesive material, optionally concrete or ceramic or metal.

In one aspect, the primary heat exchanger comprises a primary circuit traversed by a primary fluid or multiple primary circuits traversed by multiple primary fluids, optionally water, oil or salts.

In one aspect, the primary circuit comprises a heat exchange portion configured for exchanging heat with the working fluid.

In one aspect, the primary circuit comprises at least one primary storage chamber, preferably two storage chambers, for said primary fluid.

In one aspect, the primary circuit comprises a hot primary storage chamber, for the hot primary fluid accumulated after having removed heat from the working fluid in the charge configuration/phase of the apparatus/process, and a cold primary storage chamber, for the cold primary fluid accumulated after having transferred heat to the working fluid in the discharge configuration/phase of the apparatus/process.

In one aspect, the primary circuit comprises a heat regenerator with fixed bed, preferably operating at atmospheric pressure, hit by the primary fluid.

In one aspect, the secondary heat exchanger comprises a secondary circuit traversed by a secondary fluid, optionally air or water.

In one aspect, the secondary circuit comprises a heat exchange portion configured for being hit by the working fluid.

In one aspect, the secondary circuit comprises at least one secondary storage chamber for said secondary fluid.

In one aspect, the secondary circuit comprises a hot secondary storage chamber, for the hot secondary fluid accumulated after having removed heat from the working fluid in the charge configuration/phase of the apparatus/process, and a cold secondary storage chamber, for the cold secondary fluid accumulated after having transferred heat to the working fluid in the discharge configuration/phase of the apparatus/process.

In one aspect, the secondary heat exchanger is interposed between the primary heat exchanger and said tank.

In one aspect, the secondary heat exchanger is integrated in the tank.

In one aspect the secondary heat exchanger is provided with systems for adjusting the flow rate and/or the temperature of secondary fluid, typically water or air, capable of adjusting the pressure in the storage tanks within certain limits, when the system operates in sub-critical conditions.

The temperature adjustment can be carried out by means of supply of heat from the atmosphere or removal of heat into the atmosphere, also by exploiting the normal environmental air and water temperature oscillations at the different hours of the day.

In one aspect, the heat exchange portion of the secondary heat exchanger is housed within the tank.

In one aspect, the secondary circuit is configured to remove heat from the working fluid, in the charge configuration, or to transfer heat to the working fluid, in the discharge configuration, at a temperature lower than 100° C., optionally comprised between 0° C. and 50° C., optionally at a temperature close to the ambient temperature.

In one aspect, in the charge configuration/phase, in order for the secondary heat exchanger to operate in conditions close to the ambient temperature, due to the fact that the fluid has a critical temperature close to the ambient temperature, it is possible that the heat removal phase by the secondary heat exchanger is assisted by a phase of direct or indirect exchange with the atmosphere.

In one aspect, in the discharge configuration/phase, in order for the secondary heat exchanger to operate in conditions close to the ambient temperature, due to the fact that the fluid has a critical temperature close to the ambient temperature, it is possible that the heat supply phase by the secondary heat exchanger is assisted by a direct or indirect exchange phase with the atmosphere.

In one aspect, the tank is spherical or substantially spherical.

In one aspect, the tank is cylindrical or substantially cylindrical.

In one aspect, an external wall of the tank is made of metal.

In one aspect, a temperature of the working fluid accumulated in the tank is comprised between 0° C. and 100° C.

In one aspect, a pressure of the working fluid accumulated in the tank is comprised between 10 bar and 150 bar, preferably between 10 bar and 150 bar, preferably between 50 and 100 bar, preferably between 65 and 85 bar.

In one aspect, a ratio between a density of the working fluid when contained in the tank and a density of the same working fluid when contained in the casing is comprised between 200 and 500.

In one aspect, the secondary heat exchanger and the primary heat exchanger are configured for operating a super-critical transformation of the working fluid so that said working fluid is accumulated in the tank in super-critical phase.

In one aspect, it is provided to remove heat from the working fluid in the primary exchanger to bring it, in a T-S diagram, to a temperature higher than the critical temperature and above the Andrews curve.

In one aspect, it is provided to remove heat from the working fluid in the secondary heat exchanger, bringing it into super-critical phase and making it follow the right part of the Andrews curve.

In one aspect, the secondary heat exchanger and the primary heat exchanger are configured for operating a sub-critical transformation of the working fluid so that said working fluid is accumulated in the tank in liquid phase.

In one aspect, it is provided to remove heat from the working fluid in the primary exchanger to bring it, in a T-S diagram, to a temperature lower than the critical temperature and at a point of the left part of the Andrews curve.

In one aspect, it is provided to remove heat from the working fluid in the secondary heat exchanger by making it traverse the saturated vapor zone, to bring it into liquid phase.

Further characteristics and advantages will be clearer from the detailed description of preferred but not exclusive embodiments of a plant and of a process for energy storage in accordance with the present invention.

DESCRIPTION OF THE DRAWINGS

Such description will be set forth hereinbelow with reference to the enclosed drawings, provided as only as a non-limiting example, in which.

DETAILED DESCRIPTION

With reference to the enclosed figures, reference number 1 overall indicates an energy storage plant according to the present invention.

The plant 1 for example operates with a working fluid different from atmospheric air. For example, the plant 1 operates with a working fluid selected from the group comprising: carbon dioxide $CO_2$, sulfur hexafluoride $SF_6$, dinitrogen oxide $N_2O$. In the following description, the working fluid used together with the described plant 1 is carbon dioxide $CO_2$.

The plant 1 is configured to perform a closed cyclic thermodynamic transformation (CTT), first in one direction in a charge configuration/phase and then in an opposite direction in a discharge configuration/phase, wherein in the charge configuration the plant 1 stores heat and pressure and in the discharge configuration it generates electric energy.

Figure 1:
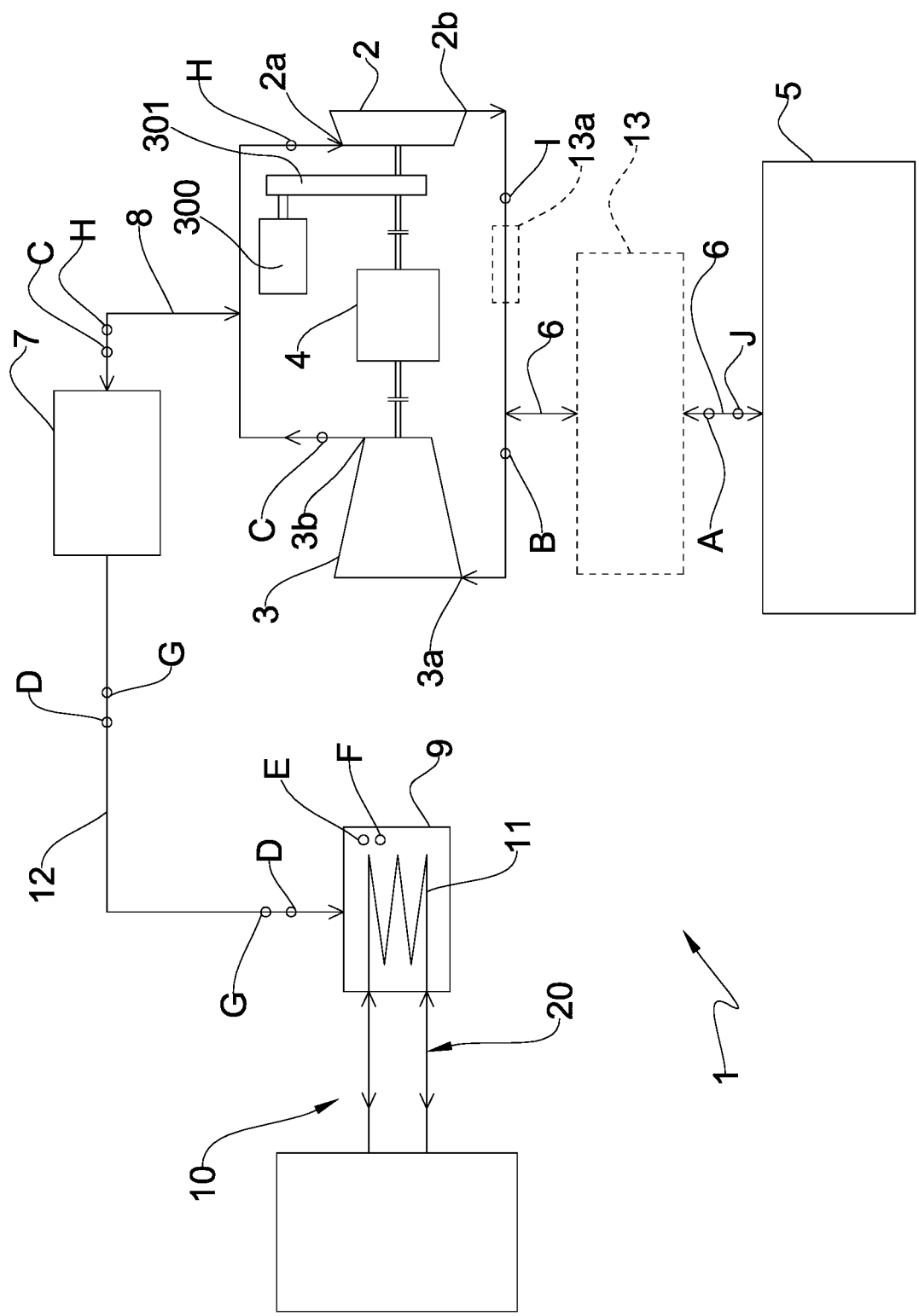
FIG. 1 schematically illustrates an embodiment of an energy storage plant according to the present invention.

With reference to FIG. 1, the plant 1 comprises a turbine 2 and a compressor 3 mechanically connected to a shaft of a single motor-generator 4. The motor-generator 4, the compressor 3 and the turbine 2 are arranged on a same axis. A shaft of the turbine 2 is coupled to one end of the shaft of the motor-generator 4 by means of connection devices, e.g. of friction type, which allow connecting and disconnecting, upon command, the turbine 2 to/from the motor-generator 4. Analogously, a shaft of the compressor 3 is coupled to an opposite end of the shaft of the motor-generator 4 by means of connection devices, e.g. of friction type, which allow connecting and disconnecting, upon command, the compressor 3 to/from the motor-generator 4.

The turbine is also mechanically connected by means of transmission elements 301, represented only in a schematic manner, to a driven machine 300, schematically represented in FIG. 1, different from a generator or from a motor-generator. Such driven machine 300 may, for example, be a compressor of air or of natural gas for pipelines or for liquified natural gas (LNG) or of process gas, a pump for water or for process gas, or in any case a generally driven machine.

Figure 3:
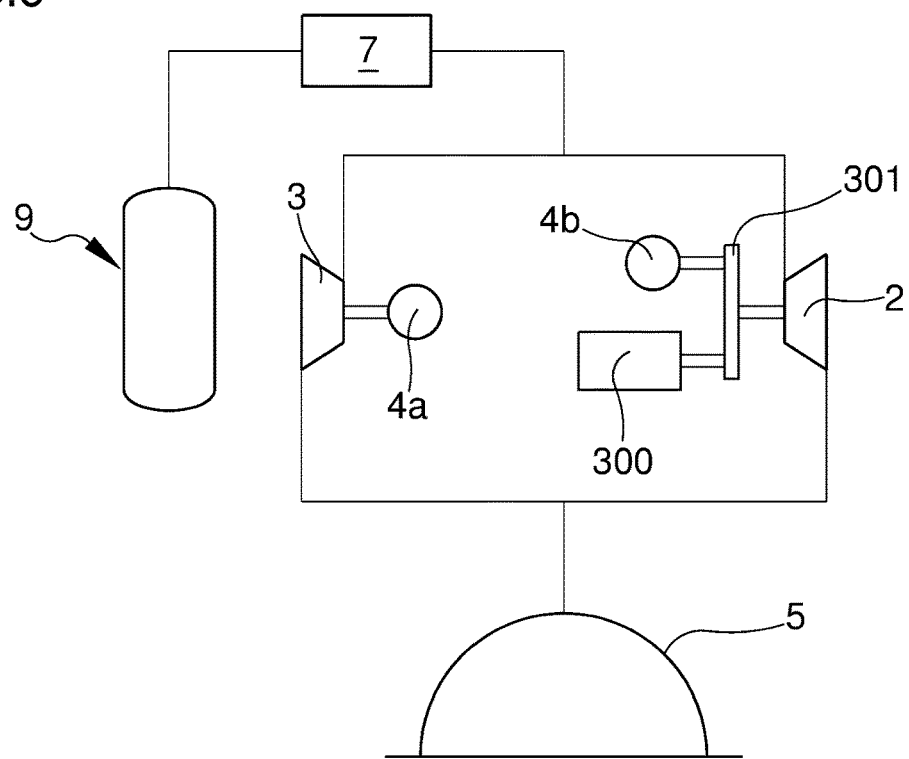
FIG. 3 illustrates an embodiment variant of the plant of FIG. 1.

In the embodiment variant illustrated in FIG. 3, the motor 4a and the generator 4b are separate elements. In such case, the motor is stably connected to the compressor 3 and the generator is stably connected to the transmission elements 301 and to the turbine 2. The motor 4a is an electric motor.

Figure 4:
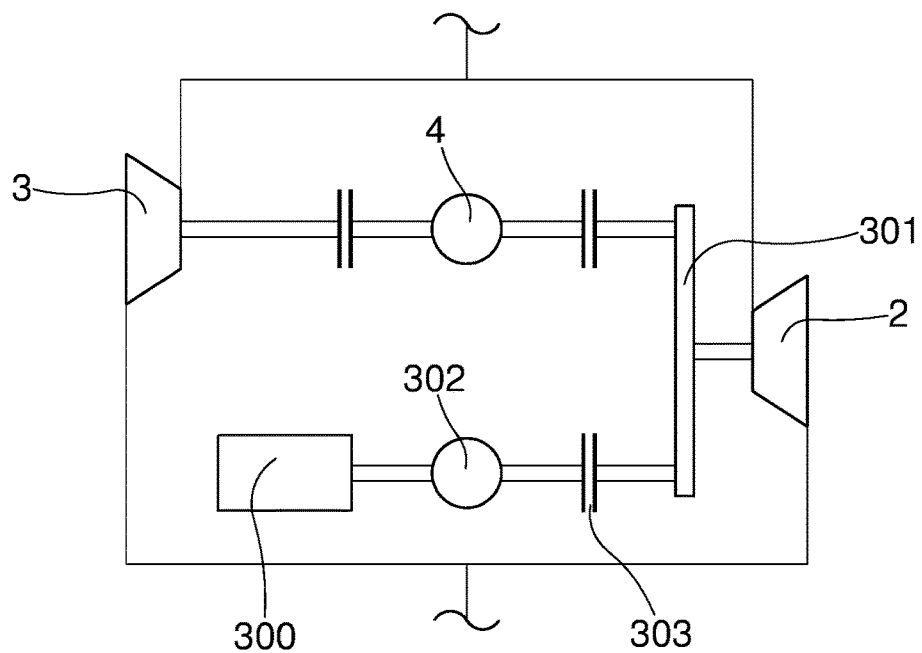
FIG. 4 illustrates a further embodiment variant of the plant of FIG. 1.

In the further variant of FIG. 4, between the driven machine 300 and the turbine 2, an auxiliary motor-generator 302 is installed and connection devices 303 of friction type are interposed between the auxiliary motor-generator 302 and the turbine 2 to selectively connect the auxiliary motor-generator 302 and the driven machine 300 to the turbine 2.

Figure 5:
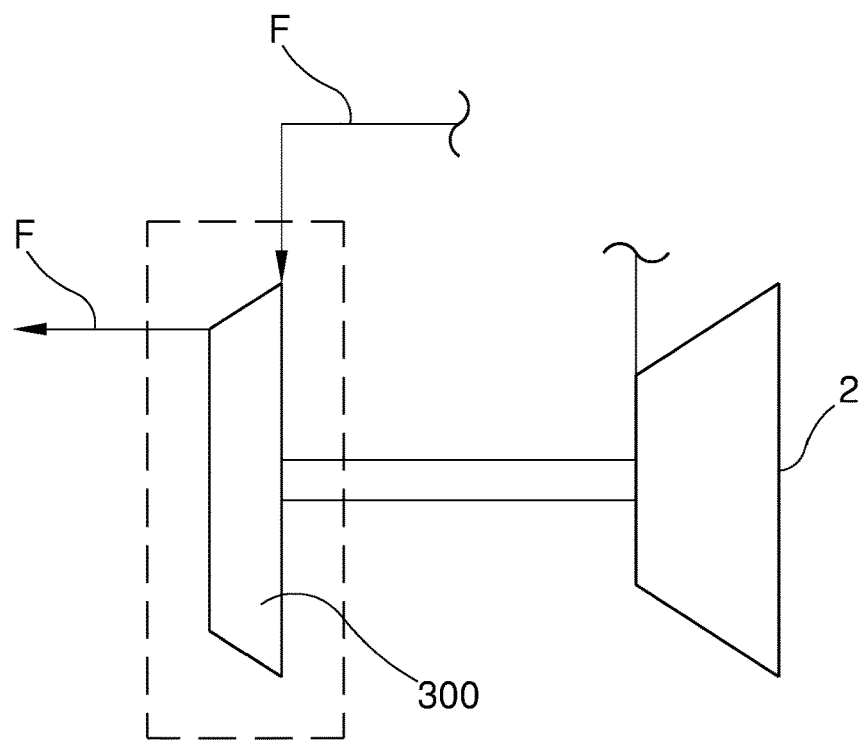
FIG. 5 illustrates a portion of the plant according to the present invention.

In further variants, the turbine 2 is mechanically connected only to one or more driven machines and it is not connected or connectable to any generator or motor-generator. For example, FIG. 5 illustrates the turbine 2 directly connected to the shaft of a compressor used for the compression of a process fluid "F". The compressor constitutes the driven machine 300. In the illustrated example, the shaft of the turbine 2 and the shaft of the compressor 300 are integral and the two machines rotate the same number of revolutions. In further variants, a reducer or gear transmission box can be provided, interposed between the turbine 2 and the compressor 300.

In further variants, not illustrated in detail in the enclosed figures, the motor 4a connected to the compressor 3 is not an electric motor but a drive machine that does not exploit electricity in order to be driven. For example, the motor 4a is a turbine, e.g. a gas turbine or vapor turbine or a wind turbine or a hydraulic turbine.

The plant 1 comprises a casing 5 preferably defined by a pressure-balloon made of flexible material, for example of PVC coated polyester fabric. The pressure-balloon is arranged at the surface and is externally in contact with the atmospheric air. The pressure-balloon delimits, at its interior, a volume configured to contain the working fluid at atmospheric pressure or substantially atmospheric pressure, i.e. in pressure equilibrium with the atmosphere. The casing 5 can also be attained as a gasometer or any other system for storing gas at low or zero over-pressure.

First pipes 6 are extended between the casing 5 and an inlet 3a of the compressor 3 and between the casing 5 and an outlet 2b of the turbine 2 in order to place the internal volume of the casing 5 in fluid communication with said compressor 3 and turbine 2. A valve or a valves system, not illustrated, can be operationally placed on the first pipes 6 in order to alternately place in fluid communication the casing 5 with the inlet 3a of the compressor 3 or the outlet 2b of the turbine 2 with the casing 5. The plant 1 comprises a primary heat exchanger 7 which can be selectively placed in fluid communication with an outlet 3b of the compressor 3 or with an inlet 2a of the turbine 2. For such purpose, second pipes 8 are extended between the inlet 2a of the turbine 2 and the primary heat exchanger 7 and between the outlet 3b of the compressor 3 and the primary heat exchanger 7. A valve, or a valves system, not illustrated, is operationally placed on the second pipes 8 in order to alternately place in fluid communication the primary heat exchanger 7 with the inlet 2a of the turbine 2 or the outlet 3b of the compressor 3 with the primary heat exchanger 7. In a preferred embodiment, only the valve or valves system placed on the second pipes 8 is present.

A tank 9 is in fluid communication with the primary heat exchanger 7 and is configured for accumulating the working fluid in liquid or super-critical phase.

The tank 9 is preferably made of metal with an external wall of spherical shape.

A secondary heat exchanger 10 is operationally active between the primary heat exchanger 7 and the tank 9, or in said tank 9, and is configured to operate on the working fluid accumulated or in charge phase in the tank 9. According to that illustrated in the embodiment of FIG. 1, the secondary heat exchanger 10 is integrated in the tank 9, in the sense that it has its own heat exchange portion 11 housed within the tank 9 and configured to be hit by the working fluid contained in said tank 9. Third pipes 12 are extended between the primary heat exchanger 7 and the tank 9 in order to place in fluid communication said primary heat exchanger 7 with said tank 9 and with said secondary heat exchanger 10.

In the schematic representation of FIG. 1, the plant 1 may also comprise an additional heat exchanger 13 operationally placed between the casing 5 and the compressor 2 and between the casing 5 and the turbine 2 and possibly a cooler 13a positioned on a branch of the first pipes 6 connected to the outlet 2b of the turbine 2.

The plant 1 also comprises a control unit, not illustrated, operationally connected to the different elements of the plant 1 itself and configured/programmed for managing the operation thereof.

The plant 1 is configured to operate in a charge configuration or in a discharge configuration, i.e. to execute a process comprising an energy charge phase and a phase of discharge and generation of energy.

Figure 2:
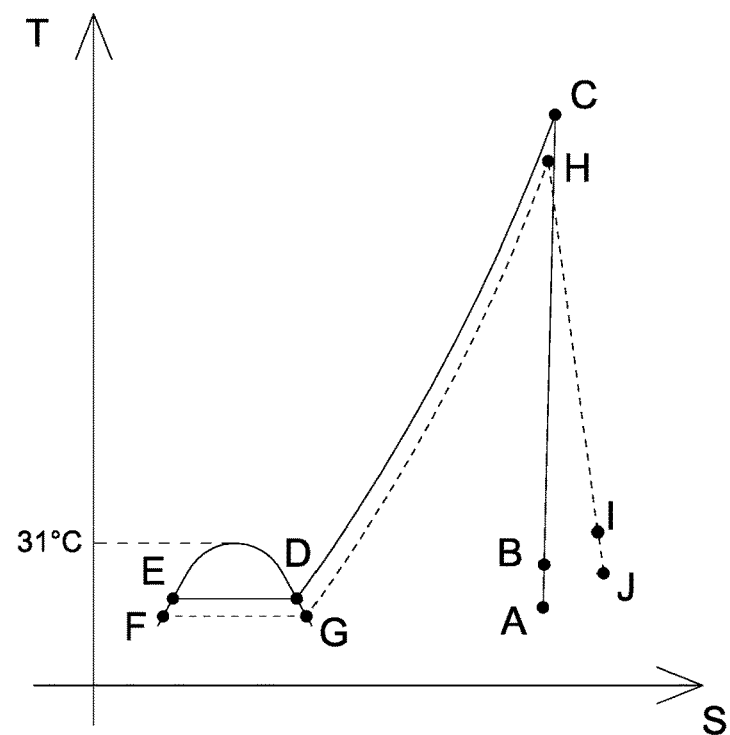
FIG. 2 is a T-S diagram illustrating a process according to the present invention actuated in the plant of FIG. 1.

In the charge configuration, the plant 1 starts from a first state in which the working fluid ($CO_2$) in gaseous form is entirely contained in the casing 5 at the atmospheric pressure or substantially atmospheric pressure and at a temperature substantially equal to the ambient temperature (point A of the T-S diagram of FIG. 2). The casing 5, by means of the valves system, is placed in communication with the inlet 3a of the compressor 3 while the communication with the outlet 2b of the turbine 2 is blocked. In addition, by means of the valves system, the primary heat exchanger 7 is placed in fluid communication with the outlet 3b of the compressor 3 and the communication with the inlet 2a of the turbine 2 is blocked. The motor-generator 4 is coupled to the solo compressor 3 and is uncoupled from the turbine 2 (which is at rest) and from the driven machine 300. The motor-generator 4 works as motor to drive the compressor 3 so as to compress the working fluid coming from the casing 5. The driven machine 300 may, for example, independently work, moved by a respective auxiliary motor dedicated thereto and not illustrated in the enclosed figures.

Before entering within the compressor 3, the working fluid traverses the additional heat exchanger 13 which works as a heater in order to pre-heat the working fluid (point B of the T-S diagram of FIG. 2). The working fluid is then compressed in the compressor 3 and is heated (point C of the T-S diagram of FIG. 2). The working fluid then flows through the primary heat exchanger 7 which works as a cooler to remove heat from the compressed working fluid, cool it (point D of the T-S diagram of FIG. 2) and store the thermal energy removed from said working fluid. In the point D, the working fluid is situated at a temperature lower than the critical temperature of said fluid and in a point on the left part of the Andrews curve or slightly outside the curve in conditions of slight over-heating. The abovementioned compression may be adiabatic, inter-cooled or isothermal.

The working fluid enters into the tank 9 where the secondary heat exchanger 10, which in this configuration works as a cooler, removes further heat from the working fluid and stores further thermal energy. The working fluid traverses the saturated vapor zone up to reaching the liquid phase (point E of the T-S diagram of FIG. 2). The tank 9 therefore stores the working fluid in liquid phase at a temperature lower than its own critical temperature Tc. In this second state, the working fluid ($CO_2$, Tc=31° C.) in liquid form, for example at 20° C., is fully contained in the tank 9. The secondary heat exchanger 10 and the primary heat exchanger 9 are therefore configured for operating a sub-critical transformation of the working fluid so that said working fluid is accumulated in the tank 9 in liquid phase.

In the discharge configuration, the plant 1 starts from the second state (point F of the T-S diagram of FIG. 2). The casing 5, by means of the valves system, is placed in communication with the outlet 2b of the turbine 2 while the communication with the inlet 3a of the compressor 3 is blocked. In addition, by means of the valves system, the primary heat exchanger 7 is placed in fluid communication with the inlet 2a of the turbine 2 and the communication with the outlet 3b of the compressor 3 is blocked. The motor-generator 4 is coupled to the turbine 2 and to the driven machine 300 and is uncoupled from the compressor 3 (which is at rest) and works as generator rotated by the turbine 2 driven by the working fluid in expansion. The turbine 2 also drives the driven machine 300, which receives energy from said turbine and may therefore be driven by means of the previously accumulated energy.

The secondary heat exchanger 10 works as a heater and transfers part of the heat, previously accumulated in the charge configuration, to the working fluid in the tank 9. The working fluid traverses the saturated vapor zone up to reaching the vapor phase (point G of the T-S diagram of FIG. 2). The working fluid traverses the primary heat exchanger 7 which now works as a heater and transfers further heat, previously accumulated in the charge configuration, to the working fluid and heats it (point H of the T-S diagram of FIG. 2).

The heated working fluid enters into the turbine 2, it is expanded and it is cooled (point I of the T-S diagram of FIG. 2) and causes the rotation of the turbine 2. The turbine 2, rotated by the heated working fluid, drives the driven machine 300 and the motor-generator 4 which works as generator and generates electric energy. The expansion of the working fluid in the turbine may be adiabatic, inter-heated or isothermal.

The working fluid exiting from the turbine 2 is cooled in the additional heat exchanger 13 (point J of the T-S diagram of FIG. 2) and returns into the casing 5 at the atmospheric pressure or substantially atmospheric pressure. The additional heat exchanger 13 in this phase accumulates additional thermal energy, in a respective further thermal energy storage device, which will be used in the subsequent charge phase in order to pre-heat said working fluid.

In the transformation illustrated in FIG. 2, the secondary circuit 20 is configured to remove heat from the working fluid, in the charge configuration, or to transfer heat to the working fluid, in the discharge configuration, to a temperature close to the ambient temperature, for example about 20° C.

Both in the charge configuration/phase and in the discharge configuration/phase, in order for the secondary heat exchanger 10 to operate in conditions close to the ambient temperature, due to the fact that the fluid has a critical temperature close to the ambient temperature, it is possible that the step of removing heat and/or the step of supplying heat by the secondary heat exchanger is/are assisted by a phase of direct or indirect exchange with the atmosphere.

For example, a temperature of the working fluid ($CO_2$) accumulated in the tank 9 is 24° C. and a pressure of the working fluid accumulated in the tank 9 is 65 bar. The density of the $CO_2$ at 25° C. and at atmospheric pressure is about 1.8 kg/m³. The density of the $CO_2$ in the tank 9 is about 730 kg/m³. The ratio between the density of the working fluid when it is contained in the tank 9 in the indicated conditions and the density of the same working fluid when it is contained in the casing 5 at atmospheric conditions is therefore about 400. It is observed in this regard that, if in place of the $CO_2$ atmospheric air stored at 65 bar and 24° C. is used in the tank 9, its density would only be 78 kg/m³ and the volume of the tank 9 theoretically necessary would be about ten times greater.

By way of example, for a plant 1 according to the invention capable of accumulating energy for 100 MWh, the volume of the pressure-balloon is about 400000 m³ while the volume of the tank is about 1000 m³.

The primary heat exchanger 7 may be a heat regenerator with fixed bed comprising a thermal mass constituted, for example, by metallic balls. In the charge configuration/phase, the thermal mass is hit by the compressed and hot working fluid, which transfers heat to the metallic balls which accumulate thermal energy. In the discharge configuration/phase, the thermal mass is hit by the cold working fluid, which absorbs heat from the metallic balls and is heated. In a variant that is not illustrated, the heat regenerator may also be of the type with movable bed. The primary heat exchanger 7 is therefore a thermal accumulator (Thermal Energy Storage TES).

In place of the heat regenerator with fixed bed, other types may be provided.

In embodiment variants, the secondary heat exchanger 10 and the primary heat exchanger 7 are configured for operating a super-critical transformation of the working fluid so that said working fluid is accumulated in the tank in super-critical phase. Unlike that illustrated in FIG. 2, the primary exchanger 7 removes heat from the working fluid up to bring it to a temperature higher than the critical temperature and above the Andrews curve. Subsequently, the secondary exchanger 10 carries the working fluid in super-critical phase by making it follow the right part of the Andrews curve.

For example, a temperature of the working fluid ($CO_2$) accumulated in the tank 9 in super-critical phase is 25° C. and a pressure of the working fluid accumulated in the tank 9 is 100 bar. The density of the $CO_2$ at 25° C. and at the atmospheric pressure is about 1.8 kg/m³. The density of the $CO_2$ in the tank 9 is about 815 kg/m³. The ratio between the density of the working fluid when it is contained in the tank 9 in the indicated conditions and the density of the same working fluid when it is contained in the casing 5 at atmospheric conditions is therefore about 450.

In addition, the secondary heat exchanger may be provided with systems for adjusting the flow rate and/or the temperature of secondary fluid, typically water or air, capable of adjusting the pressure in the storage tanks within certain limits, when the system operates in sub-critical conditions. The temperature adjustment may for example be carried out by means of supply of heat from the atmosphere or removal of heat into the atmosphere, also by exploiting the normal environmental air and water temperature oscillations at different times of the day.

In the illustrated embodiments which use $CO_2$ as working fluid, a $CO_2$ dehydration system, a dehumidifier, e.g. with zeolites, is also preferably present in order to prevent potential formation of carbonic acid in the circuit.

Figure 6:
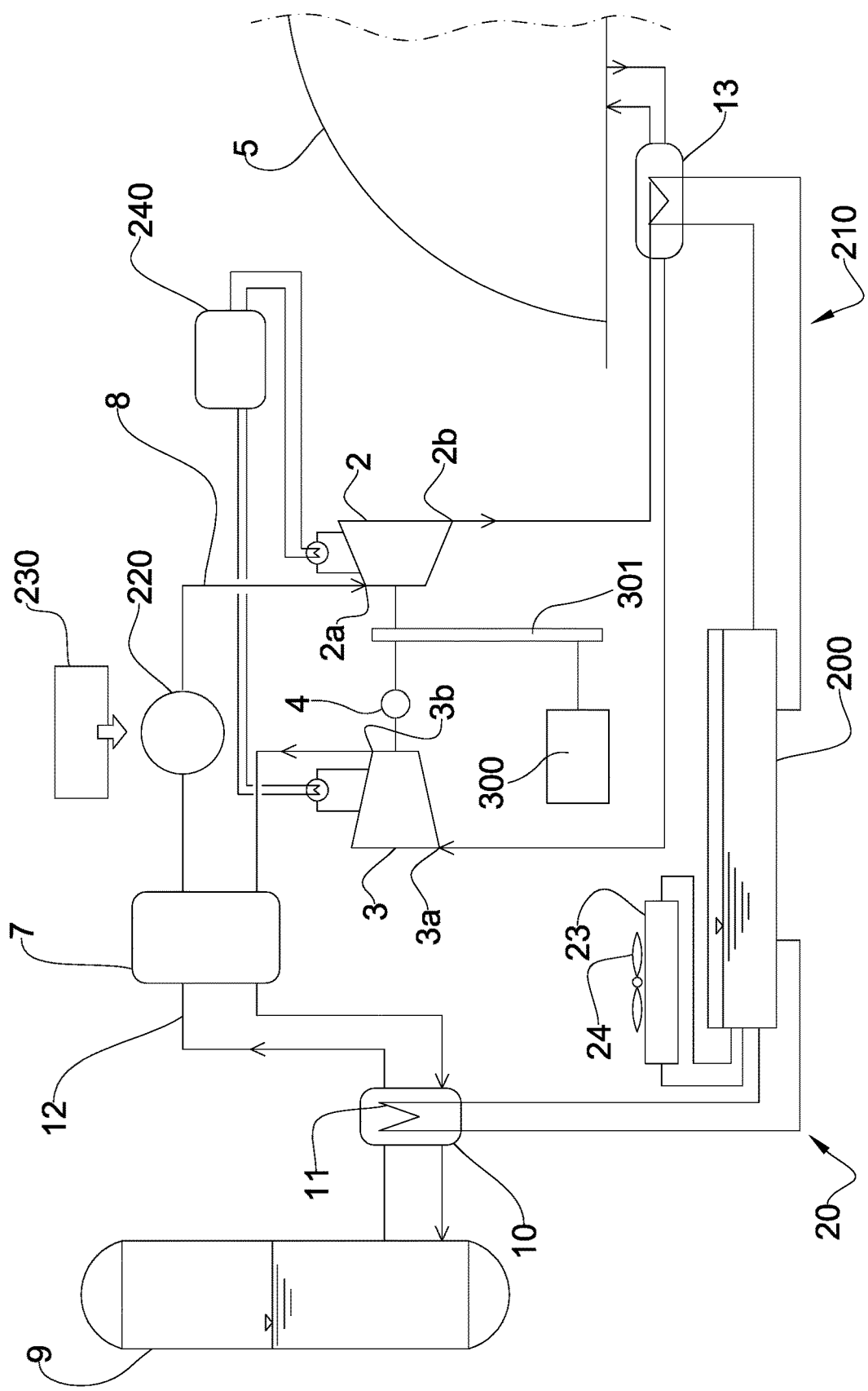
FIG. 6 illustrates a further embodiment of an energy storage plant according to the present invention.

FIG. 6 illustrates a further variant of the plant 1. Here, the main elements common to FIG. 1 are visible, i.e. the turbine 2, the compressor 3, the motor-generator 4, the casing 5, the primary heat exchanger 7 (thermal accumulator TES), the tank 9 and the secondary heat exchanger 10. The plant 1 illustrated herein also comprises the additional heat exchanger 13. As in the embodiment of FIG. 4, the secondary heat exchanger 10 is interposed between the primary heat exchanger 7 and the tank 9, i.e. it is not integrated in the tank 9. In a manner similar to the plant of FIG. 2, the secondary heat exchanger 10 comprises a secondary circuit 20 traversed by a secondary fluid, e.g. water. The secondary circuit 20, in addition to the heat exchange portion 11 comprises a secondary storage chamber 200, for the hot secondary fluid accumulated after having removed heat from the working fluid in the charge configuration/phase of the apparatus/process and for the cold secondary fluid accumulated after having transferred heat to the working fluid in the discharge configuration/phase of the apparatus/process. The abovementioned secondary storage chamber 200 is also coupled to a radiator 23 provided with one or more fans 24 placed on a recirculation duct which, for example, cools the secondary fluid during the night and heats it during the day. The abovementioned secondary storage chamber 200 is also connected by means of a respective circuit 210 to the additional heat exchanger 13.

In this embodiment variant, the plant 1 also comprises at least one further heat exchanger 220 which receives heat from an additional heat source 230. The further heat exchanger 220 is placed on the second pipes 8, between the inlet 2a of the turbine 2 and the primary heat exchanger 7. The additional heat source 230 is, as a non-limiting example, a solar source (e.g. solar field), industrial waste heat recovery, gas turbine exhaust heat, etc. The additional heat source 230 supplies additional heat during the discharge phase. The temperature to which the working fluid is brought in the discharge phase and just before entering the turbine 2, by means of the additional heat source 230 and the further heat exchanger 220, is higher than the temperature of the working fluid which is obtained at the end of compression during the charge phase. For example, the temperature to which the working fluid is brought by means of the additional heat source 230 and the further heat exchanger 220 is about 100° C., though also 200° C. or even 300° C. or even 400° C. higher than the temperature of the working fluid at the end of compression.

The plant 1 is also provided with an auxiliary thermal accumulator (Thermal Energy Storage TES) 240 connected, by means of suitable circuits, to the compressor 2 and to the turbine 2 so as to attain, in the compressor 3 (during the charge phase), an inter-cooled compression (with one or more inter-coolings) and to attain, in the turbine 2 (during the discharge phase), an inter-heated expansion (with one or more inter-heatings). The heat accumulated in the auxiliary thermal accumulator 240 during the inter-cooled compression is entirely or partly used in order to make the inter-heated expansion.

LIST OF ELEMENTS 1 energy storage plant
2 turbine
2a inlet turbine
2b outlet turbine
3 compressor
3a inlet compressor
3b outlet compressor
4 motor-generator
4a motor
4b generator
5 casing
6 first pipes
7 primary heat exchanger
8 second pipes
9 tank
10 secondary heat exchanger
11 heat exchange portion of the secondary heat exchanger
12 third pipes
13 additional heat exchanger
13a cooler
20 secondary circuit
200 secondary storage chamber
210 circuit of the additional heat exchanger
220 further heat exchanger
230 additional heat source
240 auxiliary thermal accumulator
300 driven machine
301 transmission elements
302 auxiliary motor-generator
303 connection devices

The invention claimed is:

1. An energy storage plant, comprising:
a working fluid different from atmospheric air;
a casing configured to store the working fluid, in a gaseous phase, wherein the casing is a pressure-balloon made of flexible material, the pressure-balloon being externally in contact with atmospheric air, an interior of the pressure-balloon delimiting a volume configured to contain the working fluid in pressure equilibrium with said atmospheric air;
a tank configured to store said working fluid in liquid or super-critical phase with a temperature lower than 1.2 times a critical temperature of the working fluid in Kelvin, wherein said critical temperature is between 0° C. and 200° C.; and
at least a driven machine different from an electric generator,
wherein the plant is configured to perform a closed cyclic thermodynamic transformation, first in one direction in a charge configuration and then in an opposite direction in a discharge configuration, between said pressure-balloon and said tank,
wherein in the charge configuration the plant stores heat and pressure, and
wherein in the discharge configuration the plant generates mechanical energy and transfers the mechanical energy to the driven machine to drive said driven machine.

2. The plant of claim 1, wherein the working fluid has a density at 25° C. between 0.5 kg/m$^3$ and 10 kg/m$^3$.

3. The plant of claim 1, further comprising:
a compressor and a motor mechanically connected to each other;
a turbine mechanically connected to the driven machine;
wherein said volume of the pressure-balloon is selectively in fluid communication with an inlet of the compressor or with an outlet of the turbine;
a primary heat exchanger selectively in fluid communication with an outlet of the compressor or with an inlet of the turbine;
said tank in fluid communication with the primary heat exchanger to accumulate the working fluid;
a secondary heat exchanger operationally active between the primary heat exchanger and the tank or in said tank; and
said plant being configured to operate in the charge configuration or in the discharge configuration,
wherein, in the charge configuration, the pressure-balloon is in fluid communication with the inlet of the compressor and the primary heat exchanger is in fluid communication with the outlet of the compressor, the turbine is at rest, the motor is operating and drives the compressor to compress the working fluid coming from the pressure-balloon, the primary heat exchanger works as a cooler to remove heat from the compressed working fluid, cool the compressed working fluid and store thermal energy, the secondary heat exchanger works as a cooler to remove additional heat from the compressed working fluid and store further thermal energy, the tank receives and stores the compressed and cooled working fluid, wherein the working fluid stored in the tank has a temperature close to its own critical temperature, and
wherein, in the discharge configuration, the pressure-balloon is in fluid communication with the outlet of the turbine and the primary heat exchanger is in fluid communication with the inlet of the turbine, the compressor is at rest, the secondary heat exchanger works as a heater to transfer heat to the working fluid in the tank or coming from the tank, the primary heat exchanger works as a heater to transfer further heat to the working fluid and heat it, the turbine is rotated by the heated working fluid and drives the driven machine, the working fluid returns in the pressure-balloon at atmospheric or substantially atmospheric pressure.

4. The plant of claim 3, wherein the motor is an electric motor or a heat engine.

5. The plant of claim 3, further comprising a further heat exchanger operationally coupled to an additional heat source and operationally placed between the turbine and the primary heat exchanger,
wherein said further heat exchanger is configured to further heat the working fluid in the discharge configuration before entering the turbine.

6. The plant of claim 5, wherein the additional heat source is chosen among: a solar source, industrial recovery waste heat, and gas turbine exhaust heat.

7. The plant of claim 3, further comprising a generator mechanically connected or connectable to the turbine,
wherein, in the discharge configuration, the turbine drives the generator, also generating electric energy.

8. The plant of claim 7,
wherein the motor and the generator are separate elements; or
wherein the motor and the generator are defined by a single motor-generator and the plant comprises connection devices interposed between said motor-generator and the compressor and the turbine to connect mechanically and alternately the motor-generator to the compressor or to the turbine.

9. The plant of claim 3, comprising
an auxiliary motor connected to the driven machine and configured to drive said driven machine at least when the plant is in the charge configuration; and
an auxiliary generator mechanically interposed between the turbine and the driven machine and connection devices interposed between the auxiliary generator and the turbine to selectively connect said auxiliary generator to the turbine,
wherein the auxiliary motor and the auxiliary generator are defined by a single auxiliary motor-generator.

10. The plant of claim 1, wherein the driven machine is a compressor or a pump.

11. A process for energy storage implemented with the plant of claim 1, the process comprising:
carrying out the closed thermodynamic cyclic transformation, first in said one direction in a charge phase corresponding to the charge configuration of the plant and then in the opposite direction in a phase corresponding to the discharge configuration of the plant, between the pressure-balloon and the tank.

12. The process of claim 11, wherein said critical temperature is between 0° C. and 100° C.

13. The process of claim 11, wherein said working fluid is selected from the group comprising: $CO_2$, $SF_6$, $N_2O$.

* * * * *